(12) United States Patent
Siemiet et al.

(10) Patent No.: US 7,712,918 B2
(45) Date of Patent: May 11, 2010

(54) LIGHT DISTRIBUTION USING A LIGHT EMITTING DIODE ASSEMBLY

(75) Inventors: Dennis Siemiet, Rochester Hills, MI (US); John Ivey, Farmington Hills, MI (US); Francis Palazzolo, Sterling Heights, MI (US)

(73) Assignee: Altair Engineering, Inc., Troy, MI (US)

( * ) Notice: Subject to any disclaimer, the term of this patent is extended or adjusted under 35 U.S.C. 154(b) by 0 days.

(21) Appl. No.: 11/962,995

(22) Filed: Dec. 21, 2007

(65) Prior Publication Data

US 2009/0161359 A1    Jun. 25, 2009

(51) Int. Cl.
*F21V 7/00*    (2006.01)

(52) U.S. Cl. .................. 362/241; 362/246; 362/249.02; 362/555

(58) Field of Classification Search .................. 362/240, 362/241, 242, 246, 247, 252, 255, 256, 260, 362/554, 555, 556, 800, 249.02
See application file for complete search history.

(56) References Cited

U.S. PATENT DOCUMENTS

| | | | |
|---|---|---|---|
| 4,597,033 | A | 6/1986 | Meggs et al. |
| 4,607,317 | A | 8/1986 | Lin |
| 4,748,545 | A | 5/1988 | Schmitt |
| 4,901,207 | A | 2/1990 | Sato et al. |
| 4,941,072 | A | 7/1990 | Yasumoto et al. |
| 4,943,900 | A | 7/1990 | Gärtner |
| 5,688,042 | A | 11/1997 | Madadi et al. |
| 5,810,463 | A | 9/1998 | Kawahara et al. |
| 5,890,794 | A | 4/1999 | Abtahi et al. |
| 5,949,347 | A | 9/1999 | Wu |
| 6,139,174 | A | 10/2000 | Butterworth |
| 6,283,612 | B1 | 9/2001 | Hunter |
| 6,371,637 | B1 | 4/2002 | Atchinson et al. |
| 6,404,131 | B1 | 6/2002 | Kawano et al. |
| 6,577,794 | B1 | 6/2003 | Currie et al. |
| 6,578,979 | B2 | 6/2003 | Truttmann-Bättig |
| 6,582,103 | B1 | 6/2003 | Popovich et al. |
| 6,639,349 | B1 | 10/2003 | Bahadur |
| 6,682,205 | B2 | 1/2004 | Lin |
| 6,762,562 | B2 | 7/2004 | Leong |
| 6,851,832 | B2 | 2/2005 | Tieszen |
| 6,860,628 | B2 | 3/2005 | Robertson et al. |
| 6,936,968 | B2 | 8/2005 | Cross et al. |

(Continued)

FOREIGN PATENT DOCUMENTS

CN    1584388    2/2005

(Continued)

*Primary Examiner*—Y My Quach Lee
(74) *Attorney, Agent, or Firm*—Young Basile

(57) ABSTRACT

A fluorescent light tube retrofit with light emitting diodes (LEDs) that evenly distribute light to avoid bright spots is disclosed. One tube in the form of a conventional fluorescent tube includes two LEDs mounted to the tube on opposite sides of a single circumference of the tube. The LEDs can face the center of the tube, or the LEDs can be offset facing relative to the center of the tube. A reflecting surface can be disposed inside the tube to reflect light evenly toward an arc of the tube. Alternatively, at least one LED can be oriented to direct light into a light pipe that curves around the interior of the tube.

18 Claims, 3 Drawing Sheets

U.S. PATENT DOCUMENTS

| | | |
|---|---|---|
| 7,014,336 B1 | 3/2006 | Ducharme et al. |
| 7,053,557 B2 | 5/2006 | Cross et al. |
| 7,114,830 B2 | 10/2006 | Robertson et al. |
| 7,161,313 B2 | 1/2007 | Piepgras et al. |
| 7,350,952 B2 * | 4/2008 | Nishigaki ................... 362/241 |
| 2002/0060526 A1 | 5/2002 | Timmermans et al. |
| 2004/0223328 A1 * | 11/2004 | Lee et al. .................... 362/240 |
| 2005/0110384 A1 | 5/2005 | Peterson |
| 2006/0028837 A1 * | 2/2006 | Mrakovich .................. 362/800 |

FOREIGN PATENT DOCUMENTS

| | | |
|---|---|---|
| CN | 2766345 Y | 3/2006 |
| CN | 2869556 | 2/2007 |

* cited by examiner

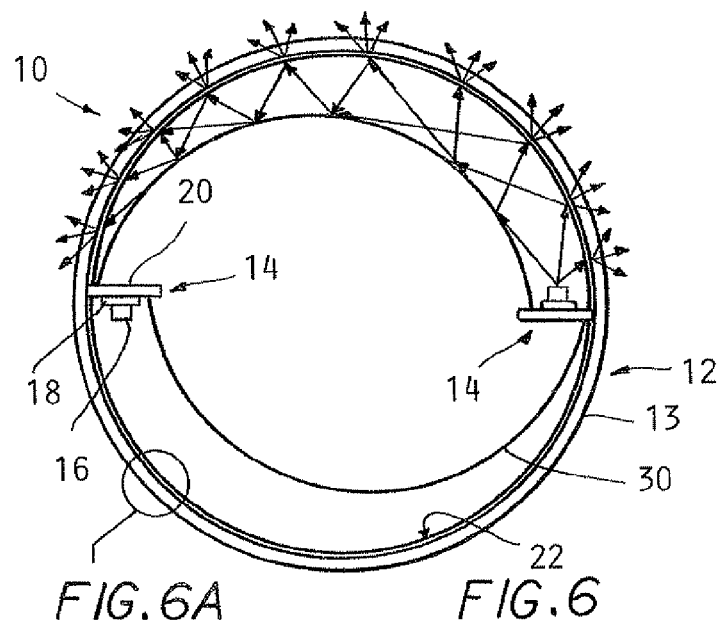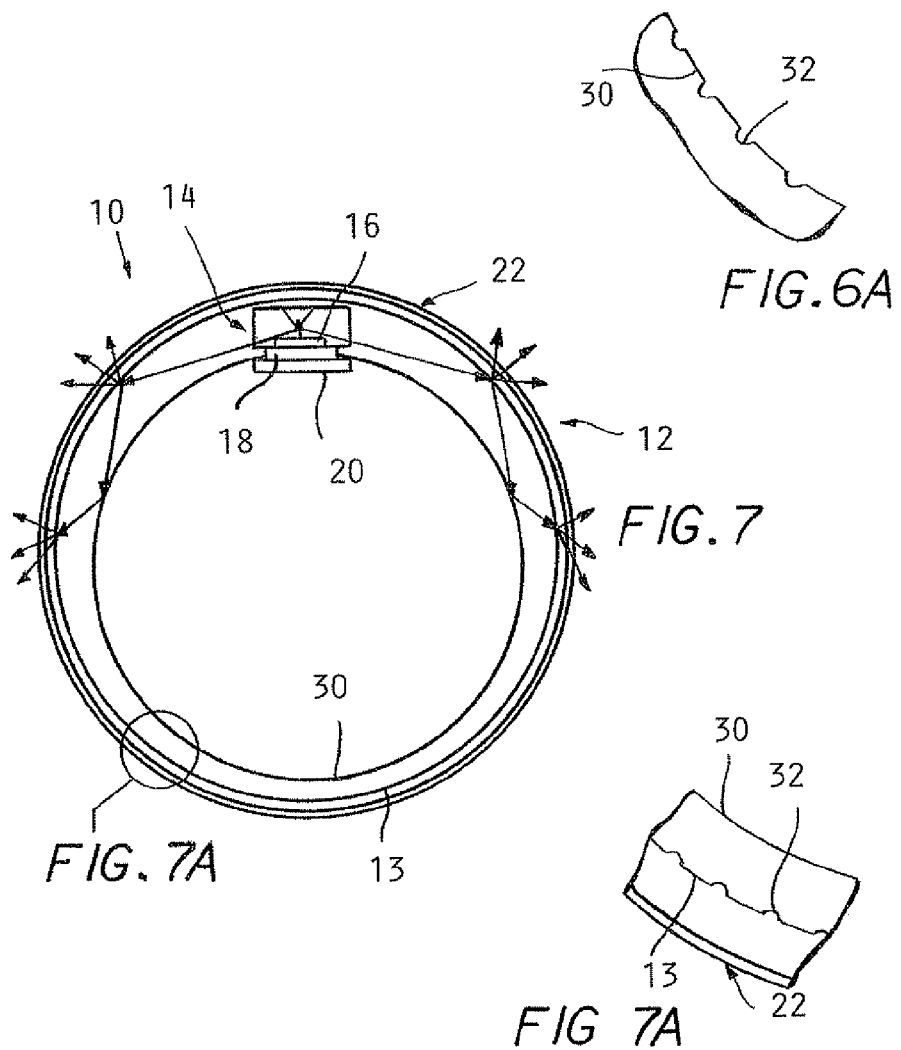

LIGHT DISTRIBUTION USING A LIGHT EMITTING DIODE ASSEMBLY

TECHNICAL FIELD

The present invention relates to a light emitting diode (LED) assembly, and more specifically, to a LED assembly that can replace a conventional fluorescent light in a conventional fluorescent light fixture.

BACKGROUND

Light emitting diodes (LEDs) have many advantages over fluorescent lights. LEDs are more efficient, last longer, and are less sensitive to vibrations and low temperatures. To take advantage of the benefits of LEDs, conventional fluorescent light tubes have been retrofit to include LEDs. For example, U.S. Pat. No. 7,049,761 discloses a tube having the shape of a conventional fluorescent light tube encasing a group of LEDs. Known fluorescent light tubes retrofit with LEDs are constrained by the directional light output of the LEDs, in contrast to the uniform non-directional light output of fluorescent tubes.

BRIEF SUMMARY

The present invention teaches LEDs in various orientations to evenly distribute light around the circumference and along the length of a tube, resulting in even lighting without obvious point sources of light. One such configuration includes a first LED assembly and a second LED assembly, each having a plurality of LEDs. A tube includes at least one tube portion, and the first and second LED assemblies are attached to longitudinal lengths of the tube portion and are oriented to face the interior of the tube. The areas of the tube that receive the least amount of light from each LED assembly receive light from multiple LED assemblies, while the sections of the tube that receive the greatest amount of light from each LED assembly only receive light from one LED assembly. Thus, in the aggregate, a similar amount of light strikes the tube around its entire circumference and along its entire length.

Another such configuration includes, for example, a tubular housing including at least one tube portion and at least one LED assembly including a plurality of LEDs. Each LED assembly is mounted to a longitudinal length of the tubular housing and is oriented to emit light parallel to a tangent of the tubular housing. This configuration also includes a light pipe associated with each LED assembly and curving inside at least a portion of the tubular housing.

Details of these embodiments, and others, are described in further detail hereinafter.

BRIEF DESCRIPTION OF THE DRAWINGS

The description herein makes reference to the accompanying drawings wherein like reference numerals refer to like parts throughout the several views, and wherein:

FIG. 6 is a side view of a tube with two radially mounted LED assemblies and two light pipes to direct light around an arc of the tube;

FIG. 6A is a partial fragmentary view of FIG. 6;

FIG. 7 is a side view of a tube with a side-emitting LED and a light pipe, and

FIG. 7A is a partial fragmentary view of FIG. 7.

DETAILED DESCRIPTION OF EMBODIMENTS OF THE INVENTION

Known fluorescent light tubes retrofit with LEDs distribute light directly toward objects to be illuminated. However, distributing light directly toward objects to be illuminated can result in harsh, uneven light and the appearance of bright spots due to the narrow viewing angle of LEDs. In contrast, embodiments of a linear distribution light emitting diode assembly that provide even light are disclosed herein. By placing LEDs in certain orientations, the appearance of bright spots is overcome, and even light is provided.

Figure 1:
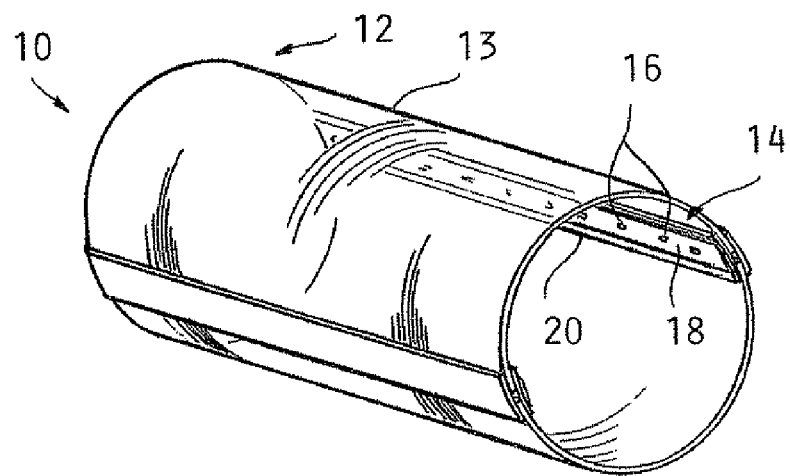
FIG. 1 is an isometric view of a transparent tube with two center-facing LED assemblies mounted along longitudinal lengths of the tube.

Embodiments of a linear distribution light emitting diode assembly are illustrated in FIGS. 1-7. The light rays illustrated in the figures are for illustrative purposes only and are not intended to accurately portray the actual dispersion of light from the LEDs. As illustrated in FIG. 1, an LED lighting unit 10 includes a tube 12 and a LED assembly 14. The tube 12 is shaped to enable the LED lighting unit 10 to be compatible with a conventional fluorescent light fixture and includes end caps for inserting the unit 10 into such a light fixture. The LED assemblies 14 extend along longitudinal lengths of the tube 12, i.e., lengths of the tube 12 parallel to the axis of the tube 12, in order to provide light to the entire length of the tube 12. The tube 12 is formed by attaching two semicircular tube portions 13 to the LED assemblies 14. The attachment between the tube portions 13 and the LED assemblies 14 can be by way of glue, screws, snap-fit mechanisms, or other suitable attachment mechanisms known to those of skill in the art.

If, however, the LED lighting unit 10 includes only one LED assembly 14 on a circumference of the tube 12 as illustrated in FIG. 7, one tube portion 13 can extend nearly a full circle from one side of the LED assembly 14 to the other. Alternatively, the tube 12 can be a conventional fluorescent light tube with LED assemblies 14 attached to its interior as illustrated by example in FIG. 5. The attachment between the tube 12 and the LED assemblies 14 can be by way of glue, screws, snap-fit mechanisms, or other suitable attachment mechanisms known to those of skill in the art. Also, the specific shape of the tube 12 depends on the desired use of the LED lighting unit 10. For example, the tube 12 need not be an elongated shape; it can be U-shaped, toroidal, or any other shaped required by the specific application. In such a case, the one or more LED assemblies 14 would still extend parallel to the axis of the tube (that is, would still extend in a longitudinal direction), but would be shaped to be compatible with the tube 12. For example, if the tube 12 is intended to replace a conventional ring-shaped fluorescent light, the LED assemblies 14 extend longitudinally around the inner and outer circumferences of the ring-shaped tube to follow the curve of the tube 12. The tube 12 can be formed of polycarbonate, glass, acrylic, and other materials known to those of skill in the art.

Figure 2:
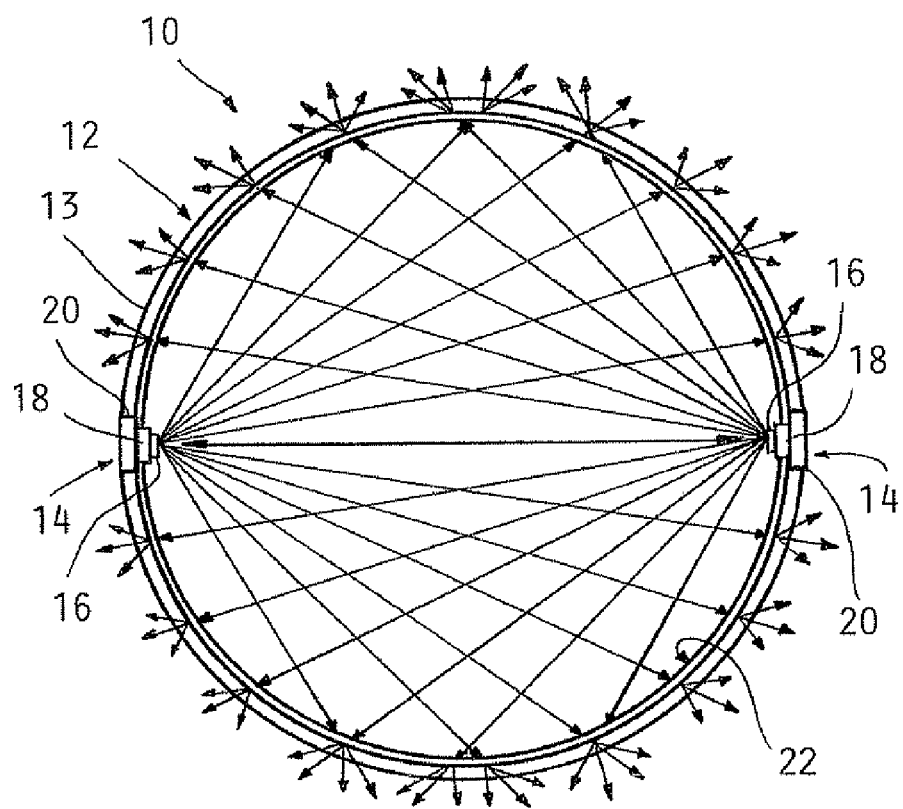
FIG. 2 is a side view of a tube with two center-facing LED assemblies mounted along longitudinal lengths of the tube.

In the illustrated FIG. 2, the tube 12 includes a diffusing surface 22. The diffusing surface 22 as illustrated is a diffusing film applied to the interior surface of the tube 12. Alternatively, the diffusing surface can include light diffusing particles in a light transmitting resin applied to the interior of a transparent tube 12. Or, instead of fixing a separate diffusing layer to a transparent tube, the tube 10 can be made of a translucent material. The tube 12 can also undergo a treatment to create a diffusing surface 22 on its interior, such as roughening the interior surface of the tube 12. Alternatively, as illustrated in FIG. 7, light extraction structures, such as ridges 32, dots, bumps, dimples, and other uneven surfaces, can be included on the interior surface of the tube 12, in which case a separate diffusing layer can be included on the exterior of the tube 12.

Each LED light assembly 14 includes a plurality of LEDs 16 and an electric circuit. The LEDs 16 included in the LED light assembly 14 emit white light. However, if desired, LEDs 16 that emit blue light, ultra-violet light or other wavelengths of light can be included. Printed circuit boards (PCB) 18 make up the electric circuitry in the illustrated embodiments. However, other types of circuit boards, for example metal core circuit boards, can be used in place of PCBs 18. Alternatively, the circuitry can be formed directly on the interior surface of the tube 12, such as by depositing copper onto the interior of the tube portions 13 before assembly. Likewise, wires can be used in place of a printed circuit board 18, so long as the LEDs 16 are electrically connected and adequately supported. When wires are used, LEDs 16 can be glued directly to a heat sink 20 or, if no heat sink is necessary in the application, to the tube 12. Because the danger of LED failure is low, the LEDs 16 can be connected in series or parallel. Heat sinks 20 are illustrated attached to each PCB 18. However, the tube portions 13 can be formed of heat-conducting plastic materials that do not require heat sinks 20. In an application where the tube 12 is arranged in a ring-shape, for example, it is desirable that the electric circuit include a flexible circuit board.

To facilitate a physical and electrical connection with a conventional fluorescent lighting fixture, end caps (not shown) are attached to each end of the tube 12. The end caps include a transformer, if necessary, and any other required electrical components. Alternatively, the electrical components can reside in a portion of the tube 12. The end caps include a necessary physical and electrical connection, such as the two-pin configuration commonly used in conventional fluorescent light fixtures. Such a structure is shown in, for example, U.S. Pat. No. 7,049,761.

In the embodiment illustrated in FIG. 2, two LED assemblies 14 are attached to longitudinal lengths of tube portions 13 to form tube 12. The LED assemblies 14 are spaced apart 180° relative to the center of the tube 12, and the LED assemblies 14 are oriented to face the center of the tube 12. While LEDs 16 emit light in multiple directions, the direction a LED 16 is said to be "facing" is determined by reference to the direction in which emitted light travels. That is, if a line were to run in the direction an LED assembly 14 is oriented to "face", an equal amount of light emitted by the LED 16 would pass on both sides of any plane including the line.

The light emitted by an LED 16 is the most concentrated in the region surrounding the direction the LED 16 faces. By placing two LED assemblies 14 on opposite sides of the tube 12 and orienting them to face the center of the tube 12, an even distribution of light around the circumference of the tube 12 is achieved because the parts of the tube 12 that receive the least amount of light from each LED assembly 14, such as the top and bottom portions of the tube 12 as shown in FIG. 2, receive light from both LED assemblies 14. The parts of the tube 12 that receive the most amount of light from each LED assembly 14, such as the area of the tube 12 in the region around where the LED 16 faces, only receive light from one LED assembly 14. Thus, in the aggregate, a similar amount of light strikes the tube 12 around its entire circumference. Further, the diffusing surface 22 provides additional bright-spot eliminating capability by diffusing the light before it exits the tube 12. While only two LED assemblies 14 are contemplated on a single circumferential path of the tube 12 in the embodiment illustrated in FIG. 2, additional LED assemblies 14 could be placed about the tube 12 for additional brightness. It is desirable but not necessary that such LED assemblies 14 be evenly-spaced about the tube 12.

Figure 3:
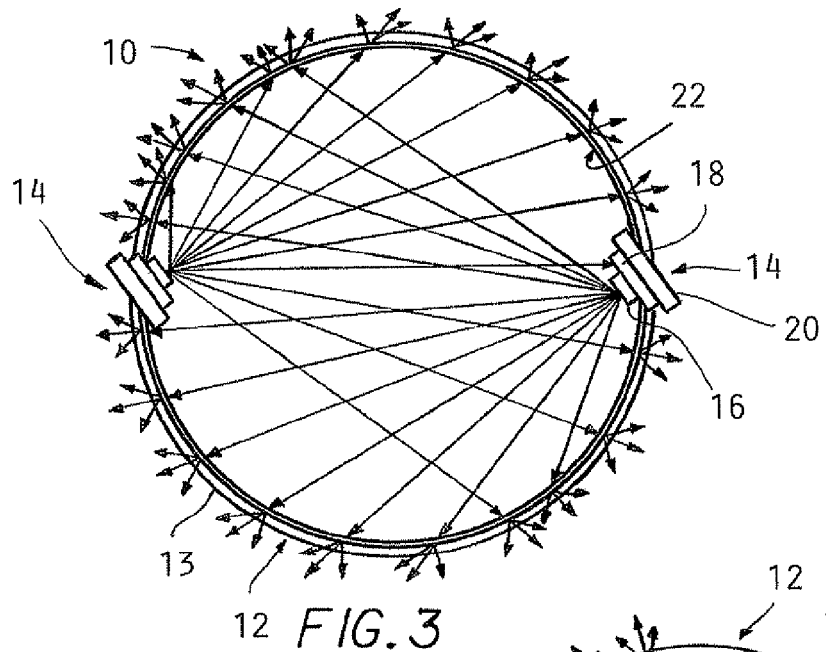
FIG. 3 is a side view of a tube with two offset LED assemblies mounted along longitudinal lengths of the tube.

A second embodiment is illustrated in FIG. 3. Here, the LED assemblies 14 are in an offset orientation; i.e., instead of facing the center of the tube 12, the LED assemblies 14 in FIG. 3 are angled slightly above and below the center of the tube 12, respectively. The LED assembly 14 orientation in the first embodiment results in some light being blocked from exiting the tube 12 by the opposing LED assembly 14. Compared to the center-facing orientation of the first embodiment, the offset orientation of the second embodiment permits an increased amount of light to exit the tube 12, resulting in an increased overall brightness of the LED lighting unit 10. The number of LED assemblies 14 around one circumference of the tube 12 and the spacing of the LED assemblies 14 can be varied from the configuration shown in FIG. 3, but it is desirable that such assemblies 14 be distributed evenly around the circumference of the tube 12 as mentioned above. Additionally, the offset angle, i.e., the angle between the direction a LED 16 faces and the center-facing direction, can be varied. The greater the offset angle, the less light is blocked by the opposing LED assembly 14. However, the trade-off of increasing the offset angle is that the light distribution becomes less even as the angle increases.

Figure 4:
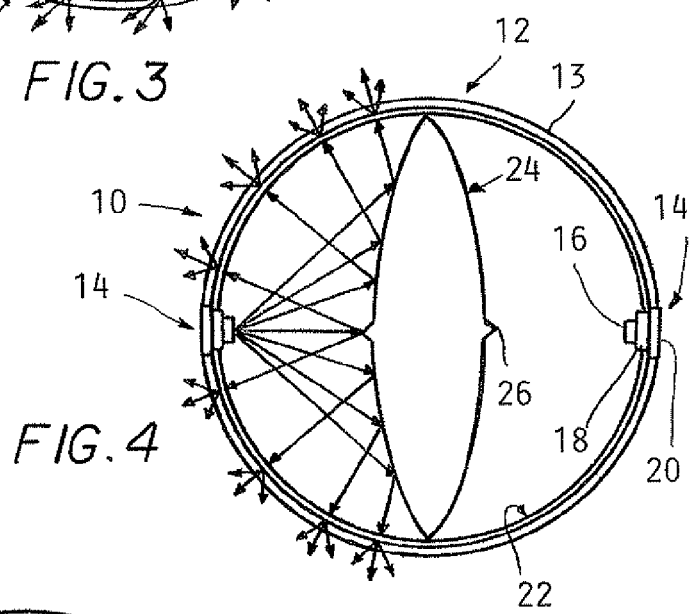
FIG. 4 is a side view of a tube with two center-facing LED assemblies and a reflecting surface positioned between the two LED assemblies.

In another embodiment, as shown in FIG. 4, a reflecting surface 24 is placed inside the tube 12. The reflecting surface 24 is made of a reflective material, such as a mirror made of glass or plastic with a metallic coating on its backside, and can include a diffusing surface if desired. The reflecting surface 24 spans a diameter of the tube 12. Alternatively, the reflecting surface 24 can have a major length less than the diameter of the tube 12 and can be buttressed by brackets in the tube 12 or attached to end caps at each end of the tube 12. The reflecting surface 24 has a convex shape designed to evenly distribute light throughout an arc of the tube 12. The specific curvature of the reflecting surface 24 is dependent on the viewing angle of the LEDs 16, the distance from each LED 16 to the reflecting surface 24, and the number of LEDs 16 around the circumference of the tube 12. For example, a LED 16 with a narrow viewing angle requires a greater angle of deflection than a LED 16 with a wide viewing angle in order to achieve the same distribution of light across an arc of the tube 12. Additionally, a lip 26 projects from the reflecting surface 24 near the point where each LED 16 faces the reflecting surface 24. The lip 26 is a projection from the reflecting surface 24 that directs light around the LED assembly 14 that would otherwise be reflected off the reflecting surface 24 right back toward the LED assembly 14. Thus, the lip 26 increases the amount of light that is able to exit the tube 12, thereby increasing the brightness of the LED lighting unit 10.

Figure 5:
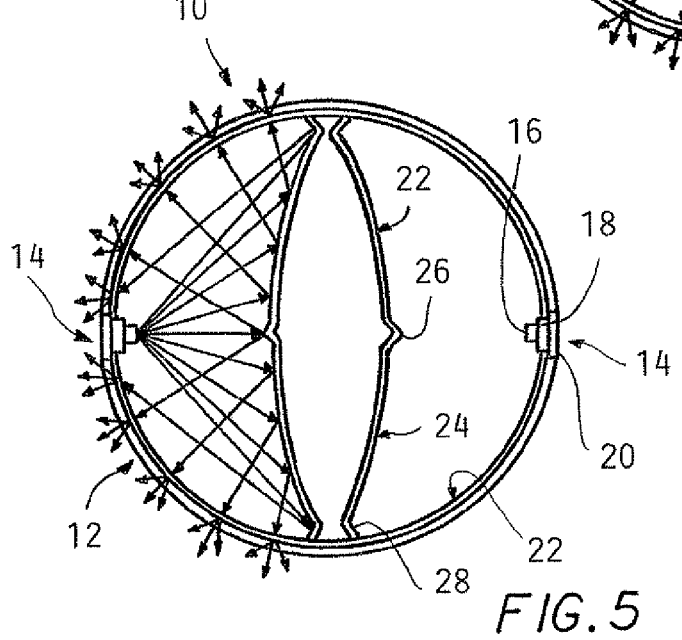
FIG. 5 is a side view of a tube similar to the tube shown in FIG. 4, but the reflecting surface has bends to direct light back toward the perimeters of the LED assemblies.

Another embodiment includes a bend 28 in the reflecting surface 24 as illustrated FIG. 5. The reflecting surface 24 in this embodiment is similar to the reflecting surface 24 in the previous embodiment, except bends 28 are disposed near the junction of the reflecting surface 24 and the tube 12. Each bend 28 is angled to direct light through the area of the tube 12 just outside the perimeter of an LED assembly 14. By directing light through the tube 12 in the vicinity of the LED assembly 14, the occurrence of dark spots created by the LED assemblies 14 is reduced. This embodiment also features a diffusing surface 22 on the reflecting surface 24.

An embodiment illustrated in FIG. 6 features at least one LED assembly 14 mounted radially to the tube 12. In this orientation, the radially-mounted LED assembly 14 faces parallel to a tangent of the tube 12 at the location the LED assembly 14 is mounted. A first end of a light pipe 30 is adjacent to each LED 16 to receive the emitted light. The pipe 30 then curves around the inside of the tube 12 until the second end of the pipe 30 is adjacent to the backside of the next LED assembly 14. The light pipe 30 tapers as it arcs around the circumference of the tube 12. The large cross section of the light pipe 30 in the vicinity of LED 16 allows a high proportion of light to arc around the tube 12 instead of exiting. As the light arcs around the tube 12 and the quantity of light in the light pipe 30 decreases due to a portion of the light exiting the tube 12, the smaller cross section of the light pipe 30 forces a higher proportion of light out of the tube 12. Thus, an even amount of light exits the tube 12 through the entire arc of the tube 12. The light pipe 30 is constructed of plastic with a metallic coating to reflect light. The light pipe 30 can also be constructed of mirrored glass. Regardless of the material selected, the light pipe 30 should have as close to total internal reflection as possible in order to maximize the brightness of the LED lighting unit 10.

The surface of the light pipe 30 in this embodiment includes light extraction structures, specifically ridges 32 as illustrated. Light extraction structures can take other shapes, such as dots, bumps, dimples, and other uneven surfaces. The size and shape of such light extracting structures can vary over a circumference and a length of the tube 12 to create a uniform distribution of light over the circumference and length of the tube 12. For example, the structures can be small and sparse near the near the LED 16 where the flux of light is high, and larger and more dense away from the LED 16 where the flux of light is low. If multiple LEDs 16 are placed around a circumference of the tube 12, there can be multiple areas around the circumference of the tube 12 that have densely spaced light extracting structures. The placement of light extracting structures is determined by software, such as the software disclosed in Michael Zollers, "Integrated Optimization Capabilities Provide a Robust Tool for LED Backlight Design," *LEDs Magazine* (October 2006), pp. 27-29, which is hereby incorporated by reference. The light extracting structure placement can also be determined in other ways, such as through experimentation or hand calculation. Alternatively, the surface of the light pipe 30 can be smooth; the light pipe 30 need not include light extraction structures.

If there is only one LED assembly 14 on a circumference of the tube 12, the light pipe 30 completes almost an entire rotation inside the tube 12 before ending on the opposite side of the LED assembly 14 from which it started, thereby distributing light over nearly the entire circumference of the tube 12. In operation, a portion of the light emitted by an LED 16 hits the tube 12 having an angle of incidence less the critical angle of the tube 12 and exits the tube 12, a portion hits the tube 12 having an angle of incidence equal to or greater than the critical angle of the tube 12 and is deflected back into the tube 12, and a portion initially contacts the light pipe 30. The light pipe 30 deflects the light that hits it back toward the tube 12. Thus, light rays can ricochet through an arc before exiting the tube 12, resulting in an even distribution of light through the are.

An embodiment illustrated in FIG. 7 features a side-emitting LED 16 and a light pipe 30 similar to the light pipe 30 in the fifth embodiment. The side-emitting LED 16 emits a disc of light at approximately a right angle to the direction the LED 16 faces. The LEDs 16 abut the tube 12 such that the LEDs 16 emit light parallel to a local tangent of the tube 12. In this embodiment, the circuit board 18 and heat sink 20 are mounted below the LED 16 on the interior of the tube 12. Alternatively, the circuit board 18 and heat sink 20 call be mounted on the outside of the tube 12. The light pipe 30 curves around the inside of the tube 12, extending from one side of the LED 16 to the other and forming a channel between the tube 12 and the light pipe 30. The light pipe 30 is tapered such that the portion of the light pipe 30 furthest from the LED 16 is closest to the tube 12. The tapered shape of the light pipe 30 causes a high proportion of light to exit the tube 12 when the quantity of light is low and results in an even distribution of light around the circumference of the tube 12. Thus, light exits the side of the LED 16 and curves around a circumference of the tube 12, reflecting between the tube 12 and the light pipe 30 until the light strikes the tube 12 at an angle less than the critical angle and exits the tube 12. Alternatively, multiple LED assemblies 14 can be disposed about the circumference of the tube 12, in which case a light pipe 30 extends between each of the LED assemblies 14. Also, light extracting structures can be placed on the light pipe 30 as discussed in the previous embodiment.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A LED lighting unit for replacing a conventional fluorescent bulb of a conventional fluorescent lighting fixture comprising:
 a tubular housing including at least one tube portion;
 a first LED assembly including a plurality of LEDs, the first LED assembly located along a first longitudinal length of the tubular housing and oriented to face an interior of the tubular housing;
 a second LED assembly including a plurality of LEDs, the second LED assembly attached to a second longitudinal length of the tubular housing and oriented to face the interior of the tubular housing, wherein the tubular housing, the first LED assembly and the second LED assembly are configured such that a substantially similar amount of light strikes the tubular housing around its entire circumference; and
 a reflecting surface extending longitudinally in the interior of the tubular housing, spaced apart from an interior surface of the tubular housing and facing at least one of the first LED assembly and the second LED assembly.

2. The LED lighting unit of claim 1, wherein the first LED assembly and the second LED assembly are spaced 180° apart relative to a center of the tubular housing and are oriented to face one another.

3. The LED lighting unit of claim 1, wherein the first LED assembly and the second LED assembly are spaced 180° apart relative to a center of the tubular housing and are oriented to face a direction offset from a radius of the tubular housing.

4. The LED lighting unit of claim 1, further comprising:
 a first heat sink attached to the first LED assembly; and
 a second heat sink attached to the second LED assembly.

5. The LED lighting unit of claim 1, wherein the tubular housing includes one tube portion having a circular cross-section.

6. The LED lighting unit of claim 1, wherein the first LED assembly and the second LED assembly each include a circuit board supporting a respective plurality of LEDs.

7. A LED lighting unit for replacing a conventional fluorescent bulb of a conventional fluorescent lighting fixture comprising:
    a tubular housing including at least one tube portion;
    a first LED assembly including a plurality of LEDs, the first LED assembly located along a first longitudinal length of the tubular housing and oriented to face an interior of the tubular housing;
    a second LED assembly including a plurality of LEDs, the second LED assembly attached to a second longitudinal length of the tubular housing and oriented to face the interior of the tubular housing; and
    a reflecting surface inside the tubular housing, wherein the reflecting surface spans a diameter of an interior surface of the at least one tube portion and has a first concave side and a second concave side, and the first LED assembly faces the first concave side and the second LED assembly faces the second concave side.

8. The LED lighting unit of claim 7, further comprising a lip that projects from a midpoint on the first concave side of the reflecting surface to direct light toward a perimeter of the first LED assembly.

9. The LED lighting unit of claim 8, wherein the reflecting surface includes a diffusing surface.

10. The LED lighting unit of claim 8, wherein the reflecting surface includes a bend located at a junction of the reflecting surface and the at least one tube portion, with the bend being angled to direct light toward a perimeter of the first LED assembly.

11. A LED lighting unit for replacing a conventional fluorescent bulb of a conventional fluorescent lighting fixture comprising:
    a tubular housing including at least one tube portion;
    a first LED assembly including a plurality of LEDs, the first LED assembly located adjacent a first longitudinally-extending portion of the tubular housing such that the plurality of LEDs is oriented to face away from the first portion and into an interior of the tubular housing; and
    a second LED assembly including a plurality of LEDs, the second LED assembly located adjacent a second longitudinally-extending portion of the tubular housing such that the plurality of LEDs is oriented to face away from the second portion and into the interior of the tubular housing, wherein each tube portion has an arc-shaped cross-section, a transparent outer layer, a diffusing interior layer, and is made of at least one of polycarbonate, acrylic and glass.

12. The LED lighting unit of claim 11 wherein the at least one tube portion comprises:
    a first semicircular tube portion attached to the first LED assembly and the second LED assembly; and
    a second semicircular tube portion attached to the first LED assembly and the second LED assembly.

13. The LED lighting unit of claim 11 wherein the at least one tube portion comprises:
    the first portion of the tubular housing; and
    the second portion of the tubular housing, each of the first portion and the second portion having a semi-circular shape with a first longitudinally-extending edge and an opposite, second longitudinally-extending edge; and wherein
    the first edge of the first portion is attached to the first LED assembly and the second edge of the first portion is attached to the second LED assembly; and wherein
    the first edge of the second portion is attached to the second LED assembly and the second edge of the second portion is attached to the first LED assembly.

14. An LED lighting unit for replacing a conventional fluorescent tube of a conventional fluorescent lighting fixture comprising:
    a tubular housing including at least one tube portion;
    at least one LED assembly including a plurality of LEDs, each LED assembly mounted to a longitudinal length of the tubular housing and oriented to emit light parallel to a tangent of the tubular housing;
    a light pipe associated with each LED assembly and curving inside at least a portion of the tubular housing;
    a plurality of light extracting structures on an interior surface of the tubular housing; and
    a diffusing layer on an exterior surface of the tubular housing.

15. The LED lighting unit of claim 14, wherein each LED assembly includes a side-emitting LED.

16. An LED lighting unit for replacing a conventional fluorescent tube of a conventional fluorescent lighting fixture comprising:
    a tubular housing including at least one tube portion;
    at least one LED assembly including a plurality of LEDs, each LED assembly mounted to a longitudinal length of the tubular housing and oriented to emit light parallel to a tangent of the tubular housing; and
    a light pipe associated with each LED assembly and curving inside at least a portion of the tubular housing;
    wherein a surface of the light pipe includes a plurality of light extracting structures and
    wherein a density of the light extracting structures varies over an arc of the light pipe.

17. The LED lighting unit of claim 16, wherein each LED assembly includes a side-emitting LED.

18. An LED lighting unit for replacing a conventional fluorescent tube of a conventional fluorescent lighting fixture comprising:
    a tubular housing including at least one tube portion;
    at least one LED assembly including a plurality of LEDs, each LED assembly mounted to a longitudinal length of the tubular housing and oriented to emit light parallel to a tangent of the tubular housing;
    a light pipe associated with each LED assembly and curving inside at least a portion of the tubular housing; and wherein
    the at least one LED asembly comprises a plurality of LED assemblies spaced about the circumference of the tubular housing;
    each LED assembly includes a circuit board mounted to extend radially into an interior of the tubular housing to form a radially-extending mounting surface for LEDs mounted thereon; and
    an entrance of each light pipe is radially-oriented and facing the radially-extending mounting surface of a respective circuit board.

* * * * *